Patented Sept. 28, 1948

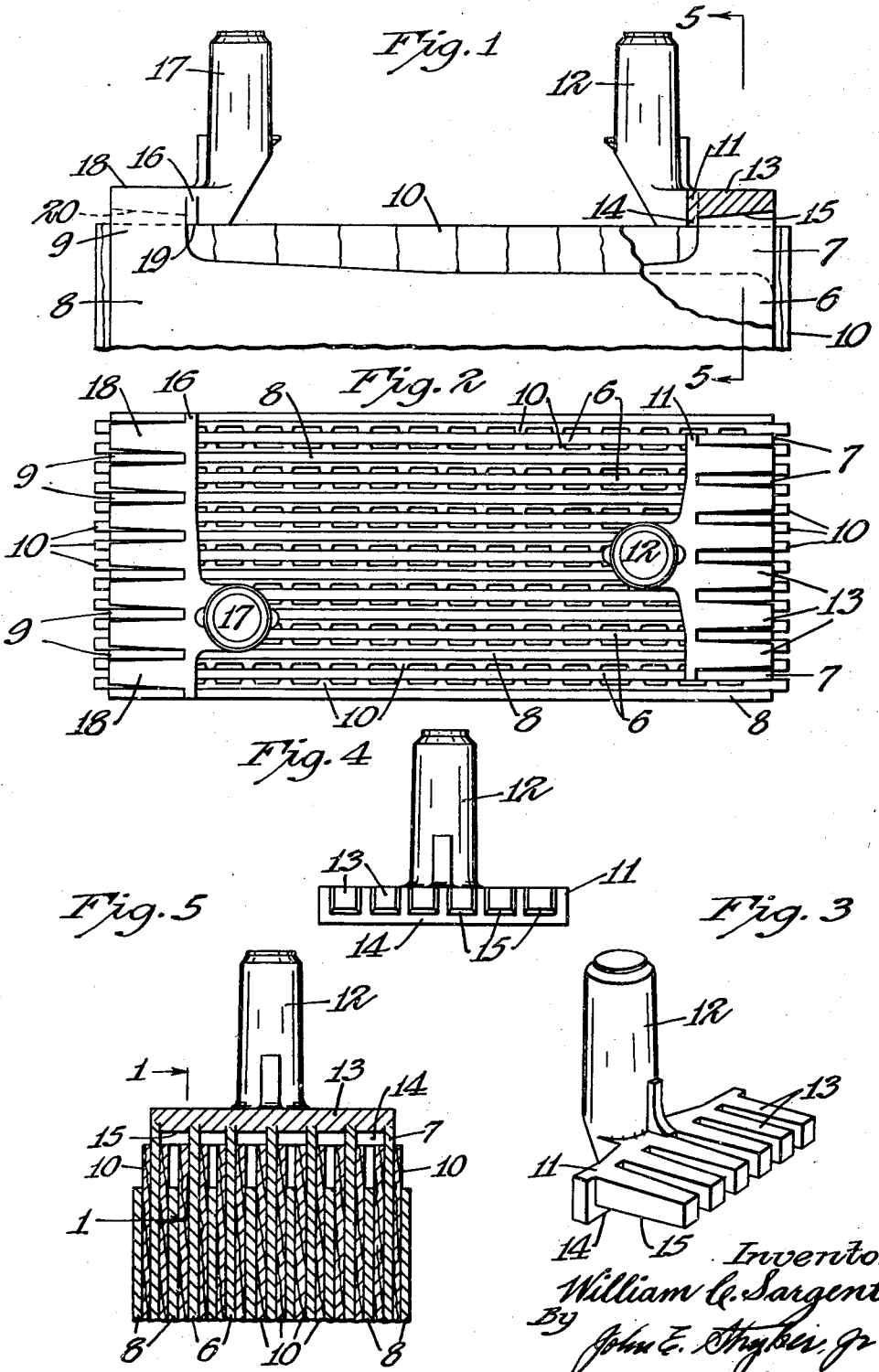

2,450,359

UNITED STATES PATENT OFFICE 2,450,359

BATTERY PLATE-CONNECTING STRAP

William C. Sargent, St. Paul, Minn., assignor to National Battery Company, St. Paul, Minn., a corporation of Delaware Application March 24, 1944, Serial No. 527,984

3 Claims. (Cl. 136—134)

It is an object of this invention to reduce the weight of metal required in the construction of the straps which are used to connect the electrodes of like polarity in storage battery cell groups and at the same time to afford adequate mechanical strength by a novel and more efficient distribution of the metal in the straps.

A particular object is to provide a novel metal casting of the character described having as an integral part of the cell terminal post a row of fingers of minimum thickness adapted to fit between and be united to the electrode lugs in combination with a relatively narrow flange projecting down from the fingers to impart adequate strength and rigidity and also to hold down the separators by engagement with their upper edges.

Experience has shown that in order to impart adequate strength to resist the rough handling that batteries receive the cell posts and immediately adjoining portions of the straps must be much heavier and stronger than would be required to merely conduct the electric current. According to the present invention, I provide the necessary mechanical strength by means of a strap of novel angle shape in cross section extending along the base of the post. This makes it practical to save metal by reducing the thickness of those portions of the strap which are more removed from the post so that in some instances the thickness of my strap directly between the plate lugs may be reduced to approximate the minimum required to give the desired current carrying capacity.

Referring to the accompanying drawing:

Figure 1 is a part side elevation and part vertical section showing a pair of my improved straps in operative relation to the plates and separators of a battery cell group;

Fig. 2 is a plan view of the cell group elements showing a pair of my improved castings in position for the burning or uniting operation with respect to the plate or electrode lugs;

Fig. 3 is an isometric view showing one of my strap and post castings;

Fig. 4 is an end view of the same, and

Fig. 5 is a section taken on the line 5—5 of Fig. 1.

As illustrated, the battery cell elements are arranged in the usual manner and comprise positive electrode plates 6 having lugs 7 projecting upward in a row near one end of the cell group, negative plates 8 having lugs 9 projecting upward in a row near the opposite end of the group and separators 10 of suitable insulating material interposed between the several plates of opposite polarity. These plates and separators are normally disposed vertically in the cell and the upper edges of the separators project above the upper edges of the plates, as shown.

To connect the lugs 7 together, I provide the casting illustrated in Figs. 3 and 4. This casting comprises a horizontally extending bar 11 having a cell terminal post 12 and a row of horizontally extending fingers 13 formed integral therewith. The fingers 13 are spaced apart to intermesh with the lugs 7, as best shown in Fig. 2, and their longitudinal dimension is equal to the width of the lugs to which they are united in the finished structure. The bar 11 has a flange 14 projecting substantially below the bottom surfaces 15 of the fingers 13, these surfaces being slightly inclined so that they diverge from the upper edges of the separators 10 toward an end of the group. By this divergence of the bottom finger surfaces from the separators below, I facilitate the assembly of the cell groups by the use of a machine such as that described in my application for patent, Serial No. 522,902, filed February 18, 1944, now Patent No. 2,430,188 dated Nov. 4, 1947, such machine having substantially horizontally movable teeth which fit between the fingers 13 and upper edges of the separators.

To connect the lugs 9 together in a row, I provide a strap and post casting comprising a horizontally extending bar 16, post 17 and fingers 18, generally similar to the casting hereinbefore described, but adapted to be united to the lugs 9 which extend in staggered relation to the lugs 7. The bar 16 has a downwardly projecting flange 19, like the flange 14, and the bottom surfaces 20 of the fingers 18 are spaced upward from the bottom surface of the flange 19 and inclined like the surfaces 15.

As shown in Fig. 2, the strap and post castings are placed in intermeshing relation to the respective rows of lugs 7 and 9 preparatory to the uniting of the fingers 13 and 18 to the lugs by burning. Sufficient heat is applied to the upper surfaces of the fingers and upper ends of the lugs to fuse these elements, as indicated in Fig. 5, thus forming continuous straps rigidly joining the plate lugs in the respective rows. These straps are unusually thin and their top and bottom surfaces converge toward the respective ends of the cell and away from the relatively heavy bars at the bases of the posts. In the finished assembly the flanges 14 and 19 engage the upper edges of the separators so that the latter are held down in the cells. This minimizes the danger of short circuits between plates of opposite polarity which might otherwise be caused by upward shifting of one or more separators and accumulations of loose active material along the upper edges of the plate supports in the cell.

It will be evident that the bottom surfaces 15 and 20 of the respective straps are spaced upward from the upper edges of the separators in the battery cells. This spacing results in a substantial saving of metal as compared with straps of ordinary construction and facilitates relatively complete utilization of the strap metal both as a conductor of current and to impart mechanical strength. This will be understood when it is considered that the spacing of the bottom strap surface from the separators makes it possible to tightly enclose the bottom while all of the cell elements are in accurately assembled relation to each other during the burning operation and to fuse the lug metal with that of the strap more thoroughly without danger of loss of metal while in a molten state. The downwardly extending flanges 14 and 19 compensate in an economical manner for the reduction in thickness of the strap by imparting adequate strength and rigidity where it is needed as a support for the post.

Having described my invention, what I claim as new and desire to protect by Letters Patent is:

1. A unitary metallic terminal for a storage battery cell having a group of plates and separators projecting above the upper edges of the plates, comprising a horizontally elongated bar formed with a downwardly projecting flange extending the full length of the bar, the lower edge of said flange being substantially straight and horizontal and adapted to be disposed at an elevation to engage the upper edges of substantially all of the separators located beneath the bar in the cell, an integral post projecting from said bar and a row of fingers integral with said bar and projecting substantially horizontally from one longitudinal side of said bar, the entire bottom surfaces of said fingers being offset upward from the lower edge of said flange and extending obliquely upward to their ends remote from said bar.

2. A unitary metallic terminal for a storage battery cell having a group of plates and separators projecting above the upper edges of the plates, comprising a horizontally elongated bar formed with a downwardly projecting flange extending the full length of the bar, the lower edge of said flange being substantially straight and horizontal and adapted to be disposed at an elevation to engage the upper edges of substantially all of the separators located beneath the bar in the cell, an integral post projecting from said bar and a row of fingers integral with said bar and projecting substantially horizontally from one longitudinal side of said bar, the entire bottom surfaces of said fingers being offset upward from the lower edge of said flange, the top surfaces of the several fingers being substantially horizontal and their bottom surfaces converging with respect to their top surfaces gradually and continuously to their ends remote from said bar.

3. A unitary metallic terminal for a storage battery cell having a group of plates and separators projecting above the upper edges of the plates, comprising a horizontally elongated bar formed with a downwardly projecting flange extending the full length of the bar, the lower edge of said flange being substantially straight and horizontal and adapted to be disposed at an elevation to engage the upper edges of a plurality of the separators in the cell, an integral post projecting from said bar and a row of fingers integral with said bar and projecting substantially horizontally from one longitudinal side of said bar, the entire bottom surfaces of said fingers being offset upward from the lower edge of said flange and a substantially vertical surface of said flange being disposed substantially in a common plane with surfaces of said bar extending between the several fingers.

WILLIAM C. SARGENT.

REFERENCES CITED

The following references are of record in the file of this patent:

UNITED STATES PATENTS

| Number | Name | Date |
| --- | --- | --- |
| 1,151,077 | Willard | Aug. 24, 1915 |
| 1,363,648 | Hubbard | Dec. 28, 1920 |
| 1,391,089 | Adams et al. | Sept. 20, 1921 |
| 1,433,680 | Ford | Oct. 31, 1922 |
| 1,942,350 | Appel et al. | Jan. 2, 1934 |
| 2,326,537 | Hill | Aug. 10, 1943 |